(12) United States Patent  
McPhee

(10) Patent No.: US 9,149,741 B2  
(45) Date of Patent: Oct. 6, 2015

(54) MOBILE FLUID TREATMENT SYSTEM AND ASSOCIATED APPARATUS

(71) Applicant: Unipure Corporation, Brea, CA (US)

(72) Inventor: Michael B. McPhee, Brea, CA (US)

(73) Assignee: Unipure Corporation, Brea, CA (US)

( * ) Notice: Subject to any disclaimer, the term of this patent is extended or adjusted under 35 U.S.C. 154(b) by 372 days.

(21) Appl. No.: 13/625,627

(22) Filed: Sep. 24, 2012

(65) Prior Publication Data

US 2014/0083921 A1    Mar. 27, 2014

(51) Int. Cl.
*B01D 21/00*  (2006.01)
*B01D 21/18*  (2006.01)
*B01D 21/24*  (2006.01)

(52) U.S. Cl.
CPC ........ *B01D 21/2444* (2013.01); *B01D 21/0003* (2013.01); *B01D 21/0018* (2013.01); *B01D 21/0045* (2013.01); *B01D 21/0057* (2013.01); *B01D 21/0069* (2013.01); *B01D 21/0072* (2013.01); *B01D 2221/08* (2013.01)

(58) Field of Classification Search
CPC ............. B01D 21/0003; B01D 21/283; B01D 21/0045; B01D 21/0018; B01D 21/18; B01D 21/00; B01D 21/0069; B01D 21/0057; B01D 21/0072; B01D 21/2444; B01D 2221/08
USPC .................. 210/249, 523, 241, 522
See application file for complete search history.

(56) References Cited

U.S. PATENT DOCUMENTS

| | | | |
|---|---|---|---|
| 3,348,686 A * | 10/1967 | Spitzer ..................... | 210/167.16 |
| 3,613,889 A | 10/1971 | Reed | |
| 4,094,338 A | 6/1978 | Bauer | |
| 4,136,023 A | 1/1979 | Kirk et al. | |
| 4,216,091 A | 8/1980 | Mineau | |
| 4,218,325 A * | 8/1980 | McMullin, Jr. ............... | 210/521 |
| 4,324,656 A * | 4/1982 | Godar ....................... | 210/170.05 |
| 4,346,005 A | 8/1982 | Zimmerman | |
| 4,367,145 A | 1/1983 | Simpson et al. | |
| 4,889,624 A * | 12/1989 | Soriente et al. ............... | 210/232 |
| 4,957,628 A * | 9/1990 | Schulz .......................... | 210/519 |
| 5,378,378 A | 1/1995 | Meurer | |

(Continued)

FOREIGN PATENT DOCUMENTS

DE    10 2004 001200 A1    8/2005
WO    WO 2011/151646 A1    12/2011
WO    WO 2011151646 A1 *  12/2011

OTHER PUBLICATIONS

International Search Report and Written Opinion for Application No. PCT/US2013/060585 dated Dec. 17, 2013.

*Primary Examiner* — Joseph Drodge

(74) *Attorney, Agent, or Firm* — Alston & Bird LLP

(57) ABSTRACT

A mobile fluid treatment system and portable fluid treatment apparatus are described. The portable apparatus is configured to be placed within a mobile tank of fluid for separating solids from the fluid and includes an upper portion, a lower portion, and a number of adjustable attachment members that can removably secure the apparatus to the side walls of the tank, thus allowing the apparatus to be moved from one tank to another. Furthermore, the lower portion of the apparatus can include a flexible hopper that funnels solids separated from the fluid toward a sediment outlet. The flexibility of the hopper allows the apparatus to fit in different sizes of tanks and further facilitates the break-up and removal of sediment from the apparatus, such as through vibration of the hopper due to the action of a sediment withdrawal pump.

19 Claims, 13 Drawing Sheets

(56) References Cited

U.S. PATENT DOCUMENTS

| | | | |
|---|---|---|---|
| 5,492,620 A * | 2/1996 | Evans | 210/96.1 |
| 5,534,141 A | 7/1996 | McAnaney et al. | |
| 5,605,636 A | 2/1997 | Wyness | |
| 6,004,456 A | 12/1999 | Khudenko | |
| 6,146,528 A | 11/2000 | Caughman, Jr. et al. | |
| 6,192,192 B1 * | 2/2001 | Illy et al. | 392/480 |
| 6,245,243 B1 | 6/2001 | Meurer | |
| 6,899,231 B2 * | 5/2005 | Larsson | 210/521 |
| 7,166,214 B2 | 1/2007 | Armstrong et al. | |
| 7,374,671 B2 | 5/2008 | Blake | |
| 7,425,260 B2 | 9/2008 | Fujisaki et al. | |
| 7,850,860 B2 | 12/2010 | Dissinger et al. | |
| 7,964,101 B2 | 6/2011 | Slough et al. | |
| 7,981,283 B2 | 7/2011 | Happel | |
| 8,137,557 B2 | 3/2012 | Ladouceur | |
| 2004/0108263 A1 | 6/2004 | Tangeman | |
| 2004/0251218 A1 | 12/2004 | Giordani et al. | |
| 2010/0276347 A1 | 11/2010 | Cui | |
| 2011/0168021 A1 * | 7/2011 | Vellinga et al. | 95/259 |
| 2011/0309015 A1 * | 12/2011 | Pashaian et al. | 210/513 |
| 2012/0006763 A1 | 1/2012 | Desai | |

* cited by examiner

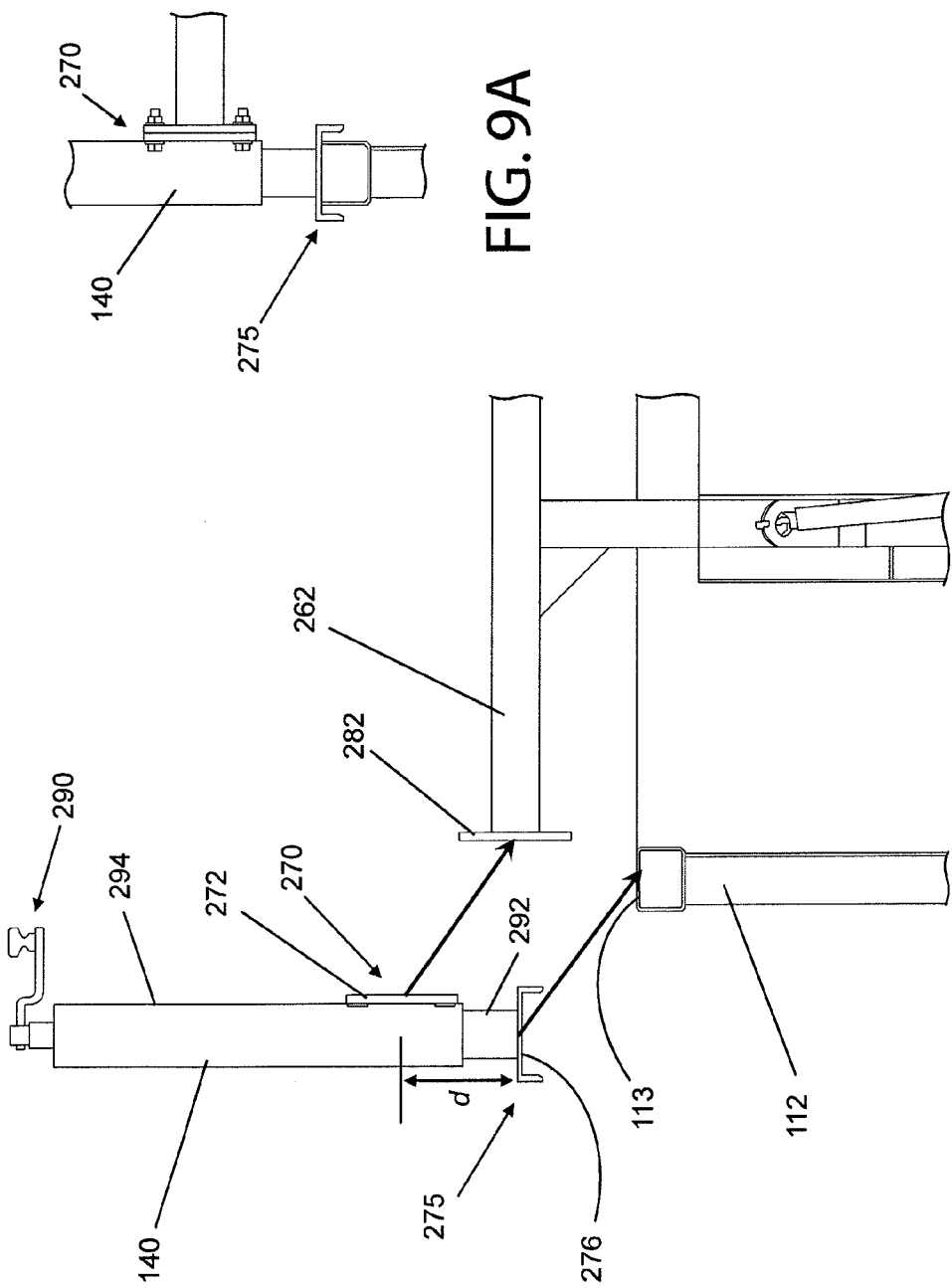

US 9,149,741 B2

MOBILE FLUID TREATMENT SYSTEM AND ASSOCIATED APPARATUS

FIELD OF THE INVENTION

The present invention relates generally to systems and apparatuses for removing solids from fluid. In particular, systems and apparatuses are provided for use in mobile fluid treatment installations.

BACKGROUND

Frac tanks, or mobile storage tanks, are used in a number of different industries to hold liquids. Although typically used for fracking wells in the oil and gas industry, frac tanks can be used to store any liquid, including run-off water, diesel fuel, glycol, oils, and waste products, among other liquids. Frac tanks are often used, for example, in applications relating to construction dewatering, industrial wastewater, groundwater remediation, surface water pretreatment, stormwater treatment, and/or site run-off, among others.

Clarifiers may be used in frac tanks to separate solids from influent liquid. The separated solids may be removed from the liquid using the clarifier, and clean liquid effluent may flow out of the tanks for further processing, discharge, or use.

Frac tanks come in different sizes and depths. Moreover, conventional frac tanks have flat bottoms, over which solids precipitated from the liquid via the clarifiers may collect.

Accordingly, there is a need in the art for mobile systems and portable apparatuses that can separate out and remove solids from liquid stored in tanks of various sizes, can be moved between tanks as needed, and can allow for a more efficient removal of the precipitated solids from the tank in a simple, low-maintenance, and cost-effective manner.

BRIEF SUMMARY OF EXAMPLE EMBODIMENTS

Accordingly, a mobile fluid treatment system and portable fluid treatment apparatus are provided. The portable apparatus is configured to be placed within a mobile tank of fluid for separating solids from the fluid and may include an upper portion, a lower portion, and a number of adjustable attachment members that can removably secure the apparatus to the side walls of the tank, thus allowing the apparatus to be moved from one tank to another. Furthermore, the lower portion of the apparatus can include a flexible hopper that is configured to allow the apparatus to fit in different sizes of tanks and facilitate the break-up and removal of sediment from the apparatus.

In some embodiments, a portable fluid treatment apparatus is provided that is configured to be placed within a mobile tank of fluid for separating solids from the fluid. The apparatus may comprise an upper portion, a lower portion, and a plurality of independently adjustable attachment members fixed to the upper portion. The upper portion may comprise a frame and an array of settler plates disposed within the frame in a parallel arrangement that are configured to direct fluid upward toward an effluent outlet and to precipitate sediment from the fluid. The lower portion may be configured to collect the sediment that is precipitated from the fluid and may comprise a sediment outlet configured to remove the sediment. The apparatus may be configured to be removably secured to side walls of the tank via the plurality of attachment members, such that the apparatus can be moved from one tank to another.

In some cases, each settler plate may be removable from the upper portion independently of other settler plates. Each attachment member may comprise a first engaging part and a second engaging part. The first engaging part may be configured to be fixed to the upper portion of the apparatus, and the second engaging part may be configured to engage a corresponding edge of a side wall of the tank. The first engaging part may be substantially perpendicular to the second engaging part. Furthermore, the first engaging part may comprise a flange, and the flange may be configured to be secured to a corresponding flange of the upper portion via fasteners. The second engaging part may define an open channel, and the open channel may be configured to receive the edge of the corresponding side wall of the tank. A width of the open channel may be larger than a width of the corresponding edge of the side wall of the tank. A distance between the first engaging part and the second engaging part may be adjustable.

In some embodiments, the lower portion may comprise a flexible hopper configured to collect and funnel the sediment toward the sediment outlet. A sediment withdrawal pump may be provided that is configured to remove the precipitated sediment from the lower portion. The flexible hopper may be configured to vibrate in response to operation of the sediment withdrawal pump, and vibration of the flexible hopper may serve to break up sediment collected in the flexible hopper and facilitate withdrawal of the sediment from the hopper.

In some cases, the apparatus may further comprise a flow deflector arranged at an influent end of the apparatus and extending at least partially between two opposing side walls of the tank. The flow deflector may be configured to direct the fluid in the tank around the influent end of the apparatus and toward influent slots defined between the upper portion and the lower portion to introduce the fluid into the upper portion. The frame of the upper portion may comprise a pair of opposing lateral members and a pair of opposing transverse members extending between respective side edges of the lateral members, and each lateral member may comprise a plurality of guides. Each guide may be configured to receive one of the plurality of settler plates. Moreover, each lateral member may define a plurality of effluent orifices, and each effluent orifice may be configured to allow treated fluid to flow from the portable fluid treatment apparatus toward the effluent outlet. In some cases, the effluent orifices may be configured to create back pressure within the upper portion of the portable fluid treatment apparatus, thereby facilitating the distribution of fluid among the settler plates.

In other embodiments, a portable fluid treatment apparatus may be provided that is configured to be placed within a mobile tank of fluid for separating solids from the fluid. The apparatus may comprise an upper portion, a lower portion, and a plurality of attachment members fixed to the upper portion. The upper portion may comprise a frame and an array of settler plates disposed within the frame in a parallel arrangement that are configured to direct fluid upward toward a fluid outlet and to precipitate sediment from the fluid, and the lower portion may comprise a flexible hopper configured to collect and funnel the sediment that is precipitated from the fluid toward a sediment outlet. The apparatus may be configured to be removably secured to side walls of the tank via the plurality of attachment members, such that the apparatus can be moved from one tank to another. The sediment outlet, in some cases, may be in fluid communication with a sediment withdrawal pump that is configured to remove the precipitated sediment from the flexible hopper.

The flexible hopper may be configured to vibrate in response to operation of the sediment withdrawal pump, and vibration of the flexible hopper may serve to break up sediment collected in the flexible hopper and facilitate withdrawal of the sediment from the hopper. The flexible hopper may comprise a material selected from the group consisting of polyethylene, polypropylene, and vinyl. Furthermore, the flexible hopper may be configured to allow the apparatus to be installed in tanks having different depths within a predetermined range of depths.

In still other embodiments, a mobile fluid treatment system is provided that includes a mobile tank and a portable fluid treatment apparatus configured to be removably installed within the mobile tank. The portable fluid treatment may comprise an upper portion, a lower portion, and a plurality of independently adjustable attachment members fixed to the upper portion. The upper portion may comprise a frame and an array of settler plates disposed within the frame in a parallel arrangement that are configured to direct fluid upward toward a fluid outlet and to precipitate sediment from the fluid. The lower portion may comprise a hopper configured to collect and funnel the sediment that is precipitated from the fluid toward a sediment outlet. Furthermore, the attachment members may be configured to removably secure the portable fluid treatment apparatus to the tank such that the portable fluid treatment apparatus can be moved from one tank to another.

In some cases, the sediment outlet of the lower portion of the portable fluid treatment apparatus may be in fluid communication with a sediment withdrawal pump that is configured to remove the precipitated sediment from the lower portion. The hopper may be flexible and may be configured to vibrate in response to operation of the sediment withdrawal pump. Vibration of the hopper may serve to break up sediment collected in the hopper and facilitate withdrawal of the sediment from the hopper. Moreover, each attachment member may comprise a first engaging part and a second engaging part. The first engaging part may be configured to be fixed to the upper portion of the apparatus, and the second engaging part may be configured to engage a corresponding side wall of the tank. A distance between the first engaging part and the second engaging part may be adjustable.

BRIEF DESCRIPTION OF THE DRAWINGS

Figure 1:
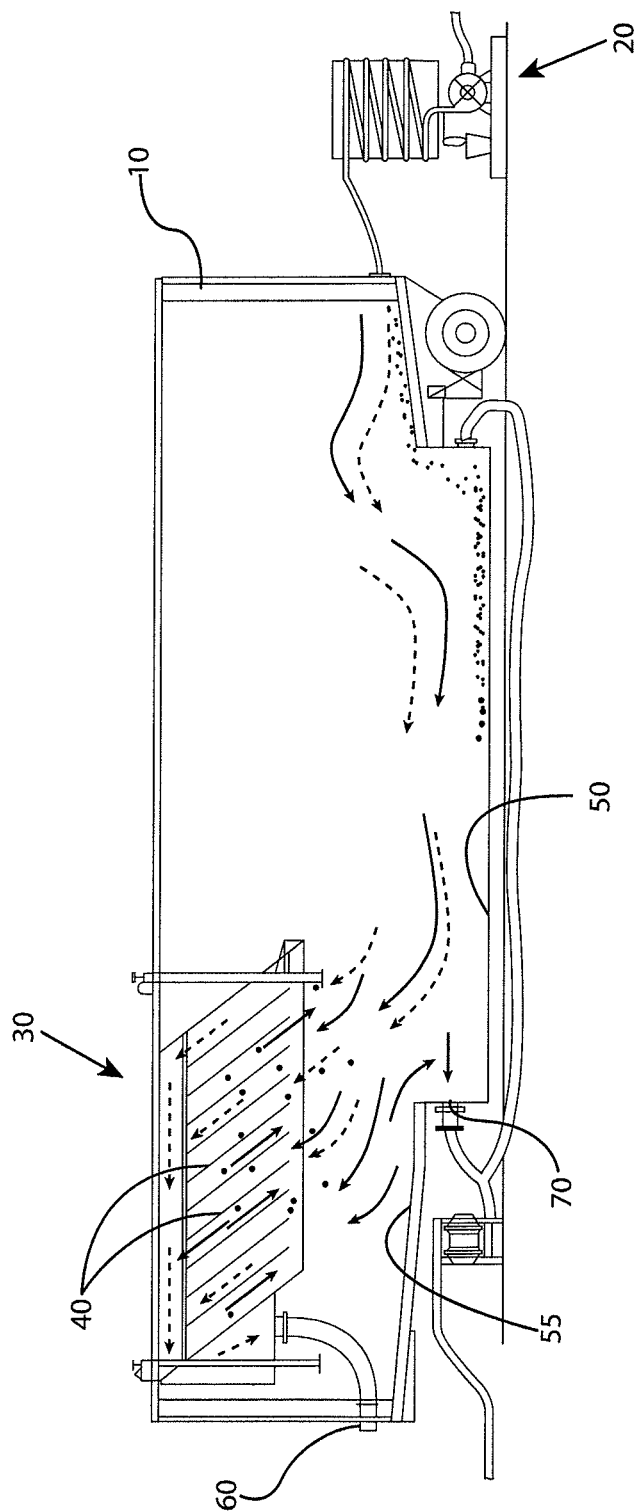
Figure 2:
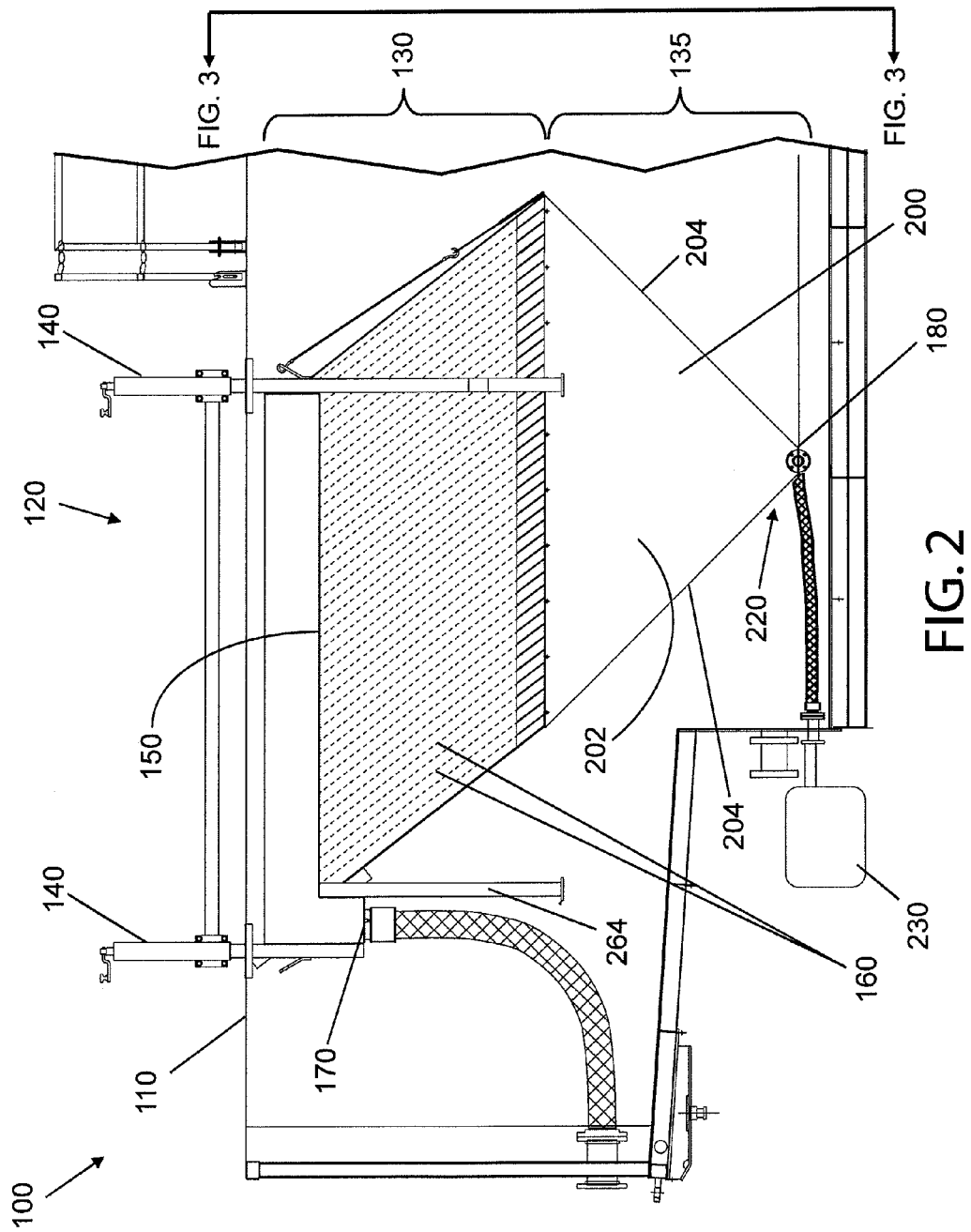
Figure 3:
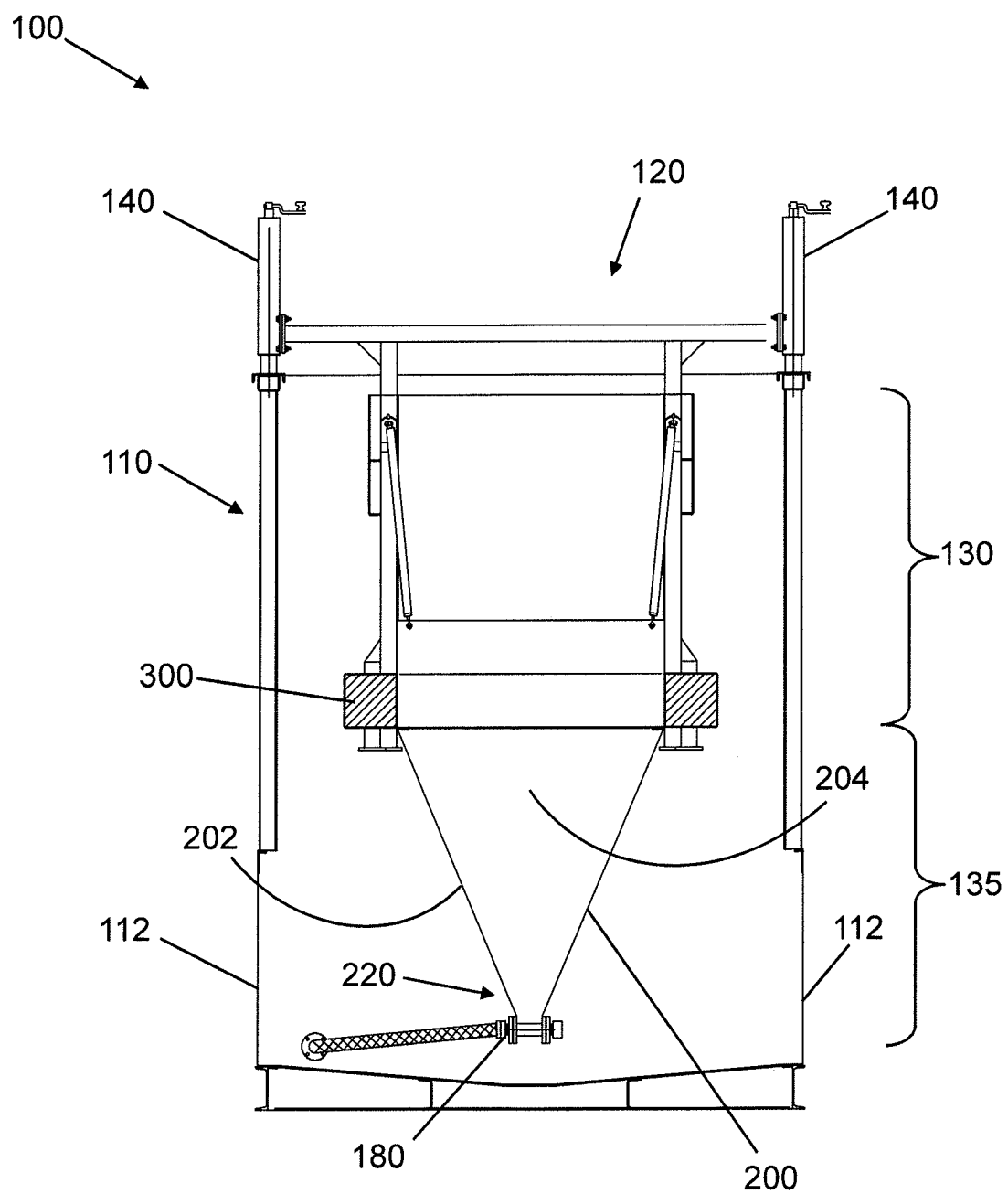
Figure 4:
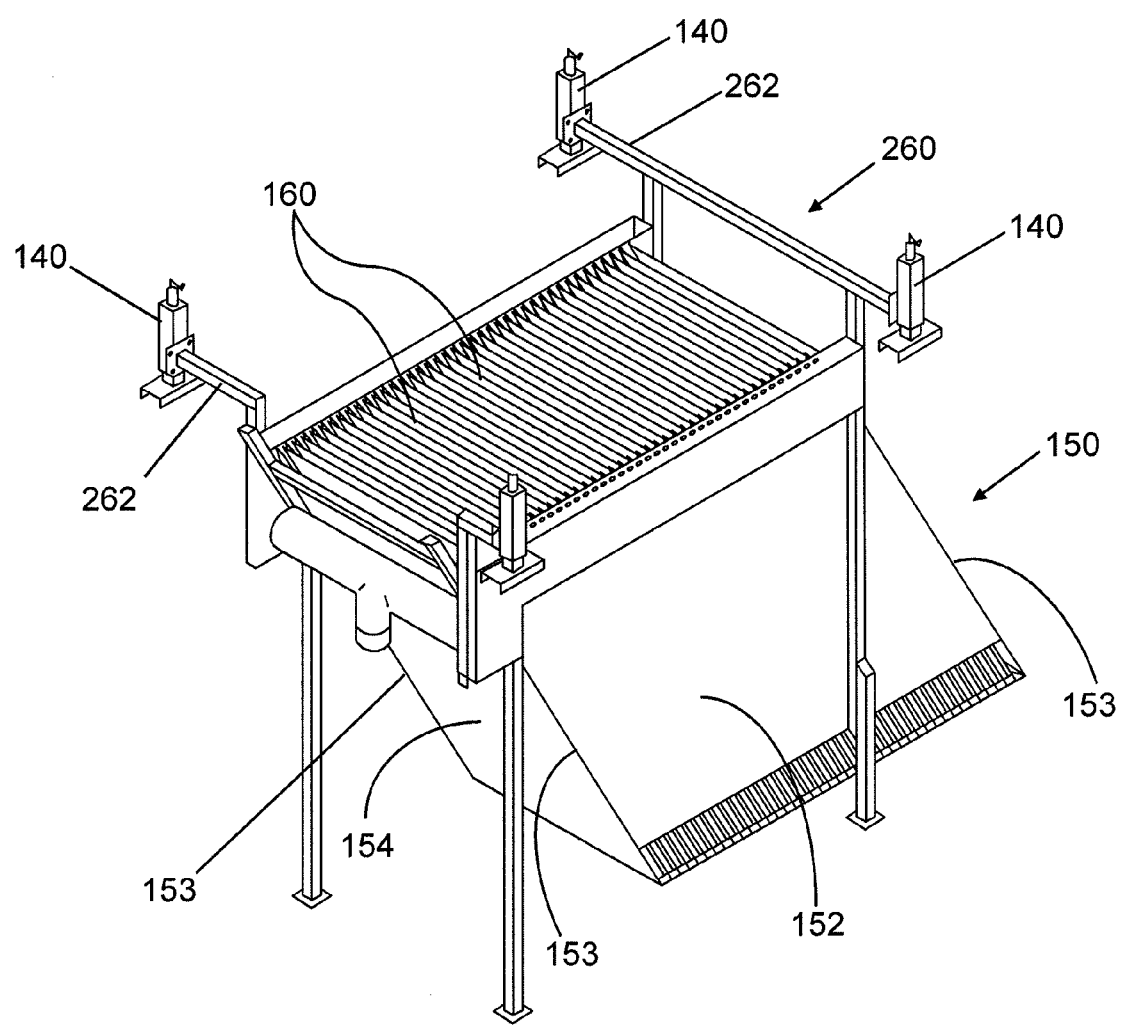
Figure 5:
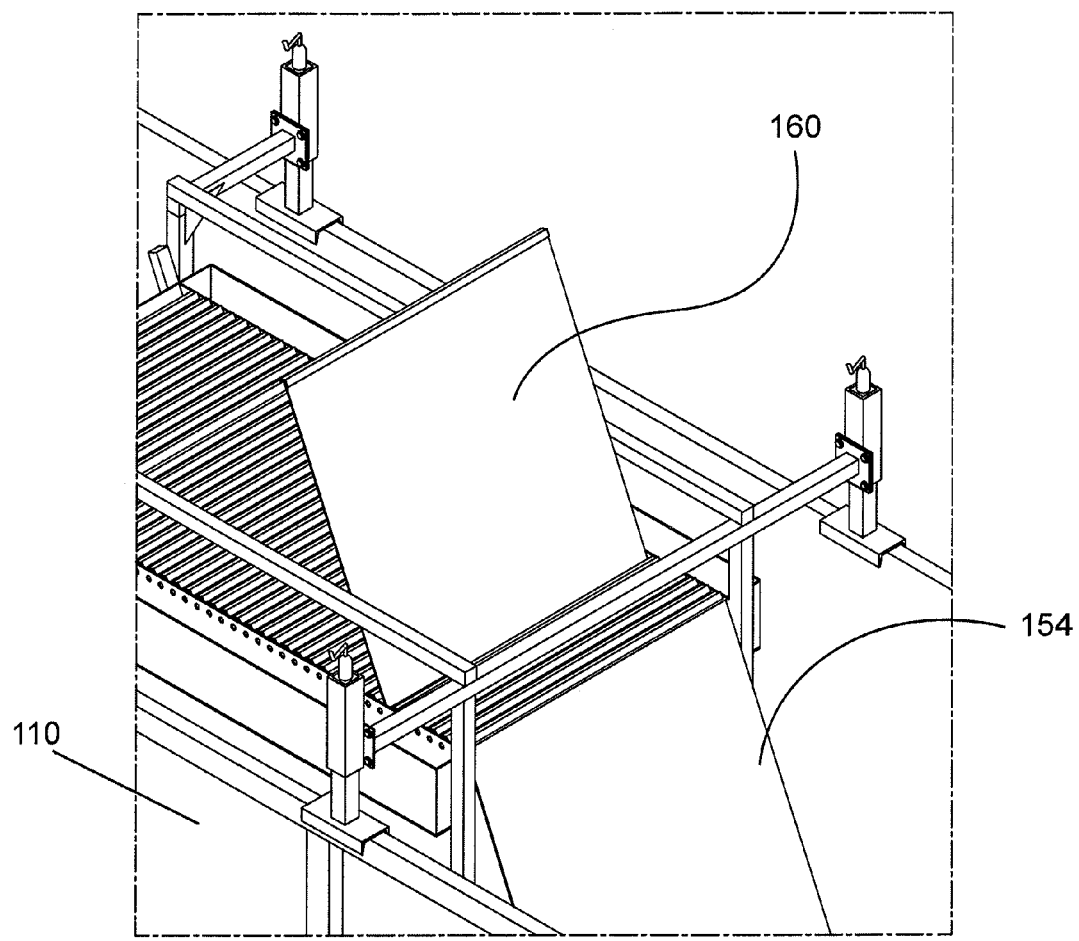
Figure 6:
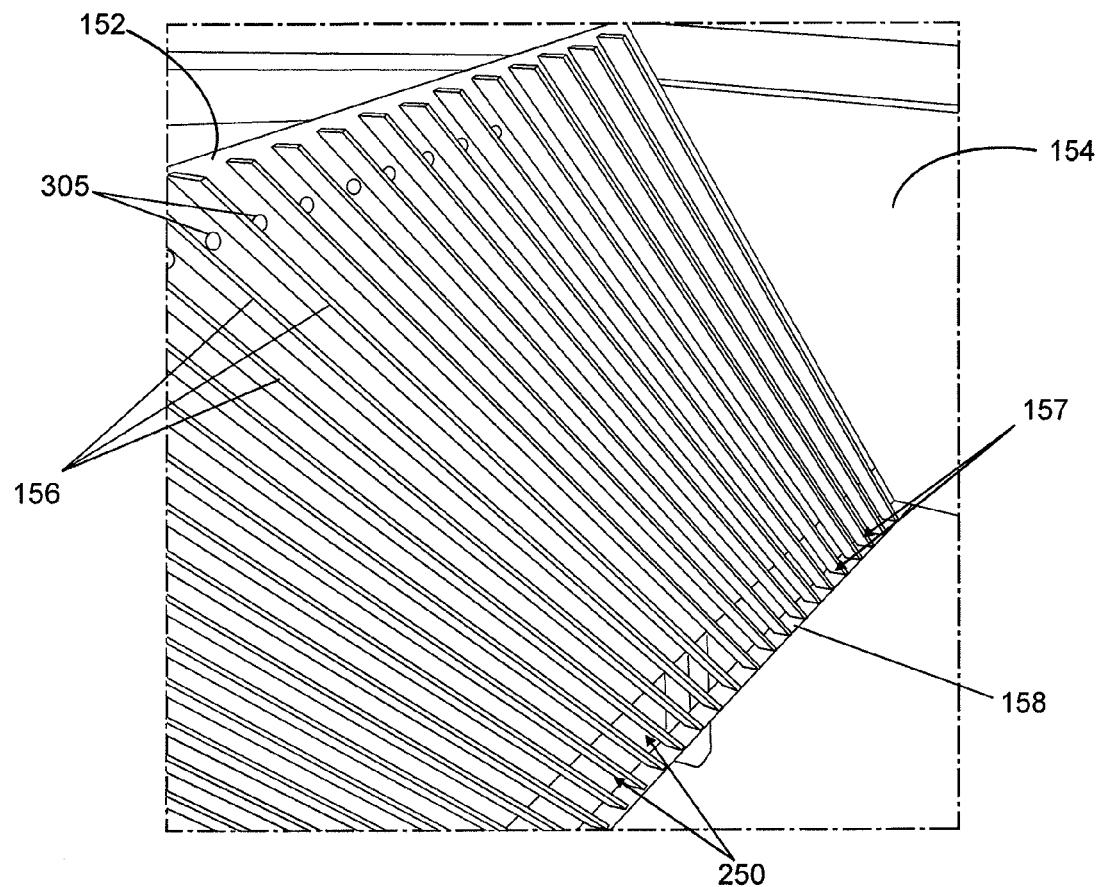
Figure 7:
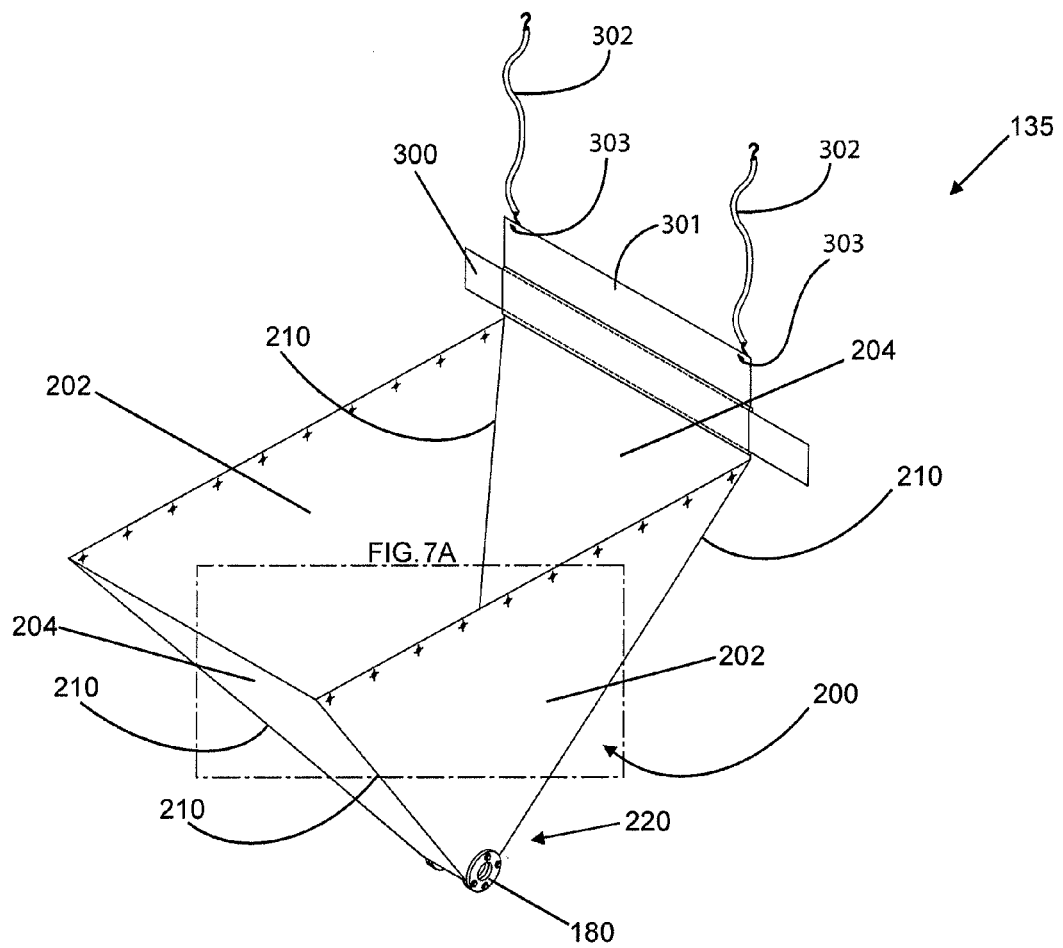
Figure 7A:
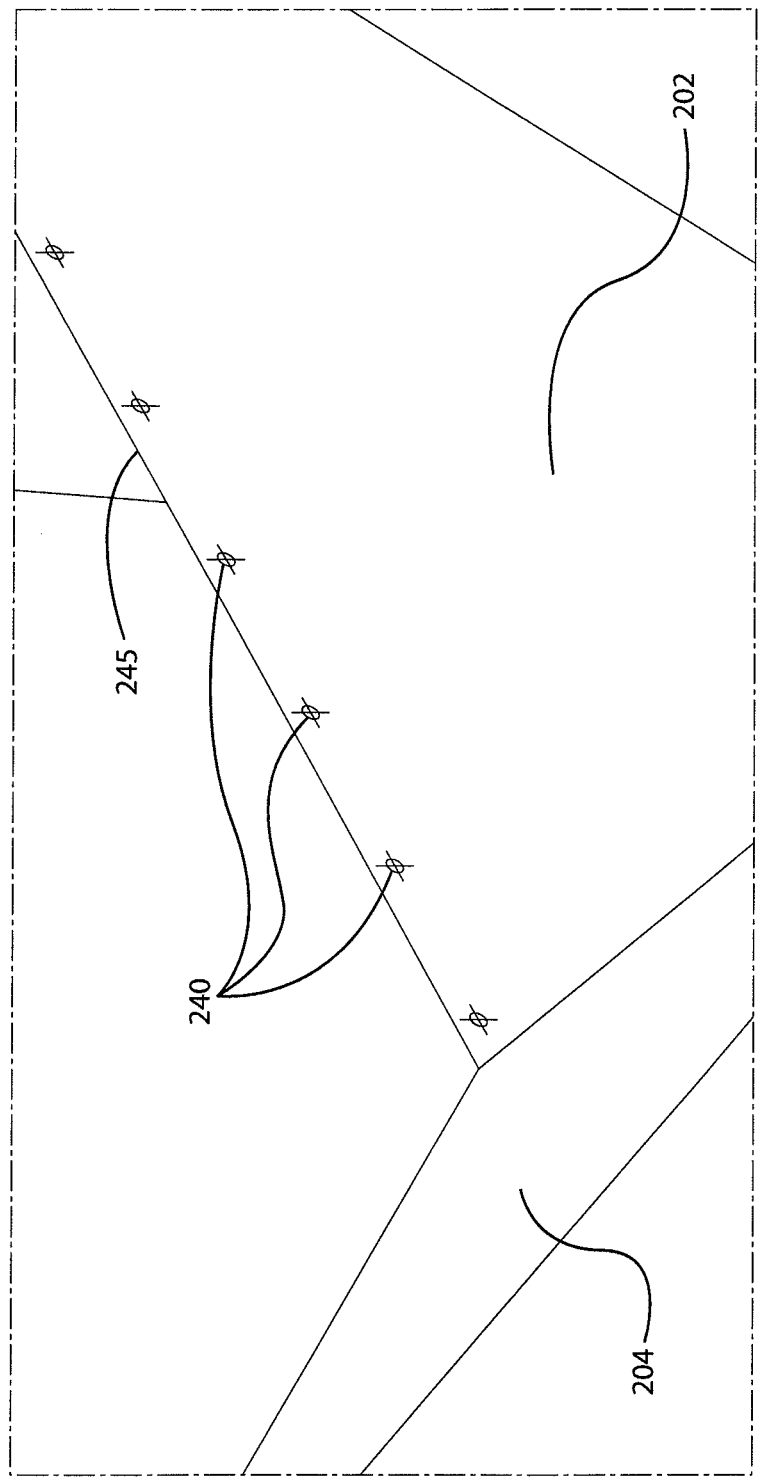
Figure 8:
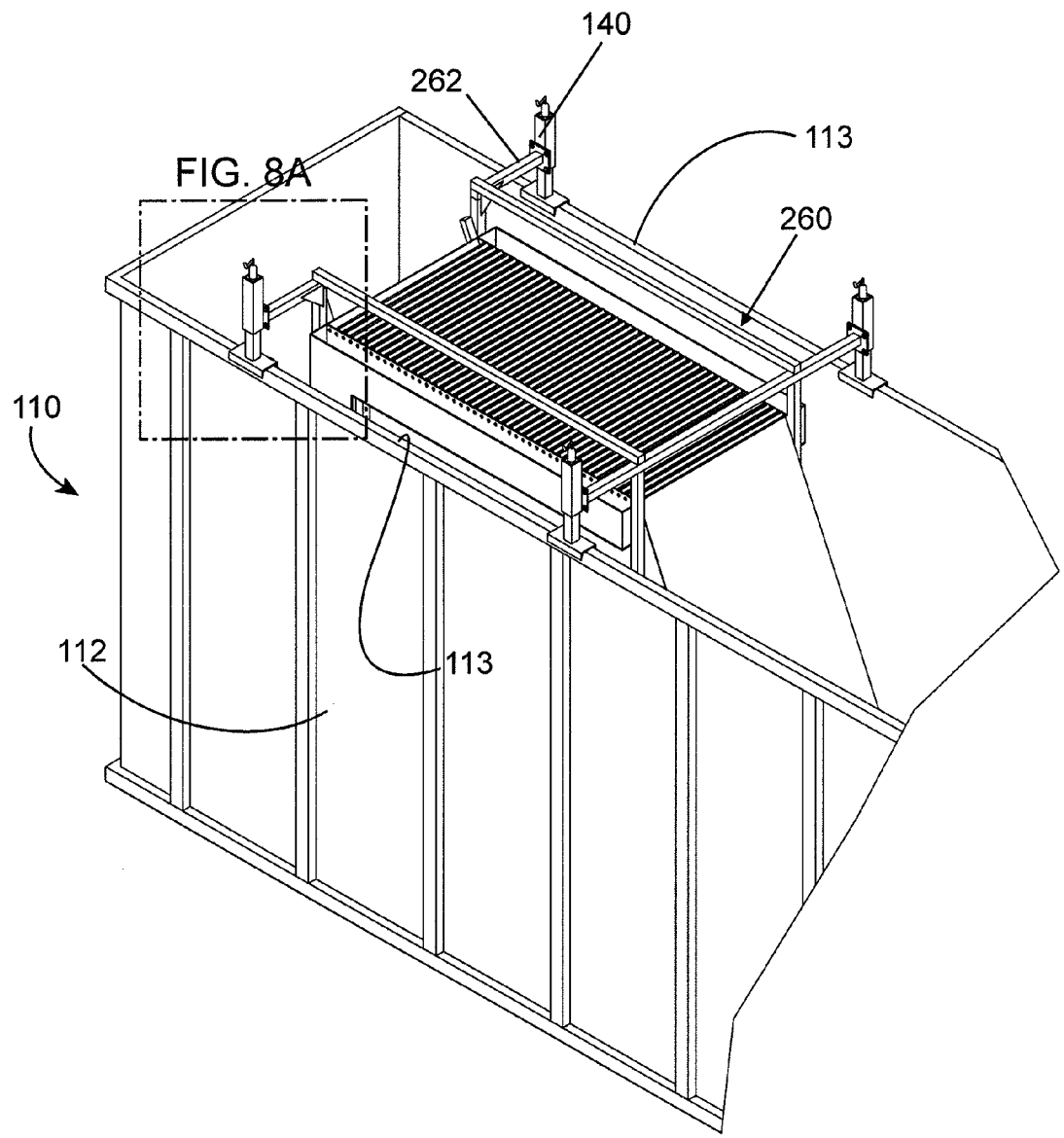
Figure 8A:
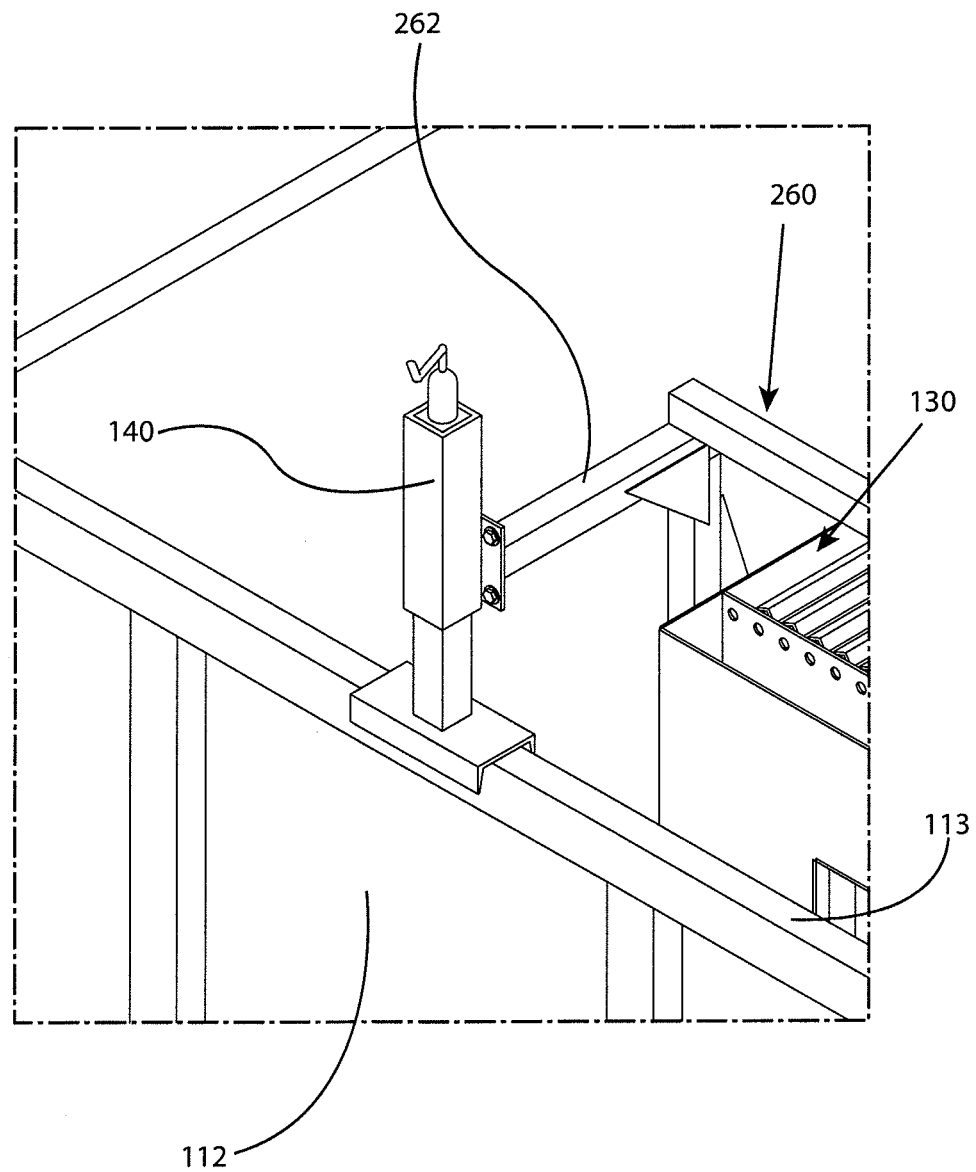
Figure 10:
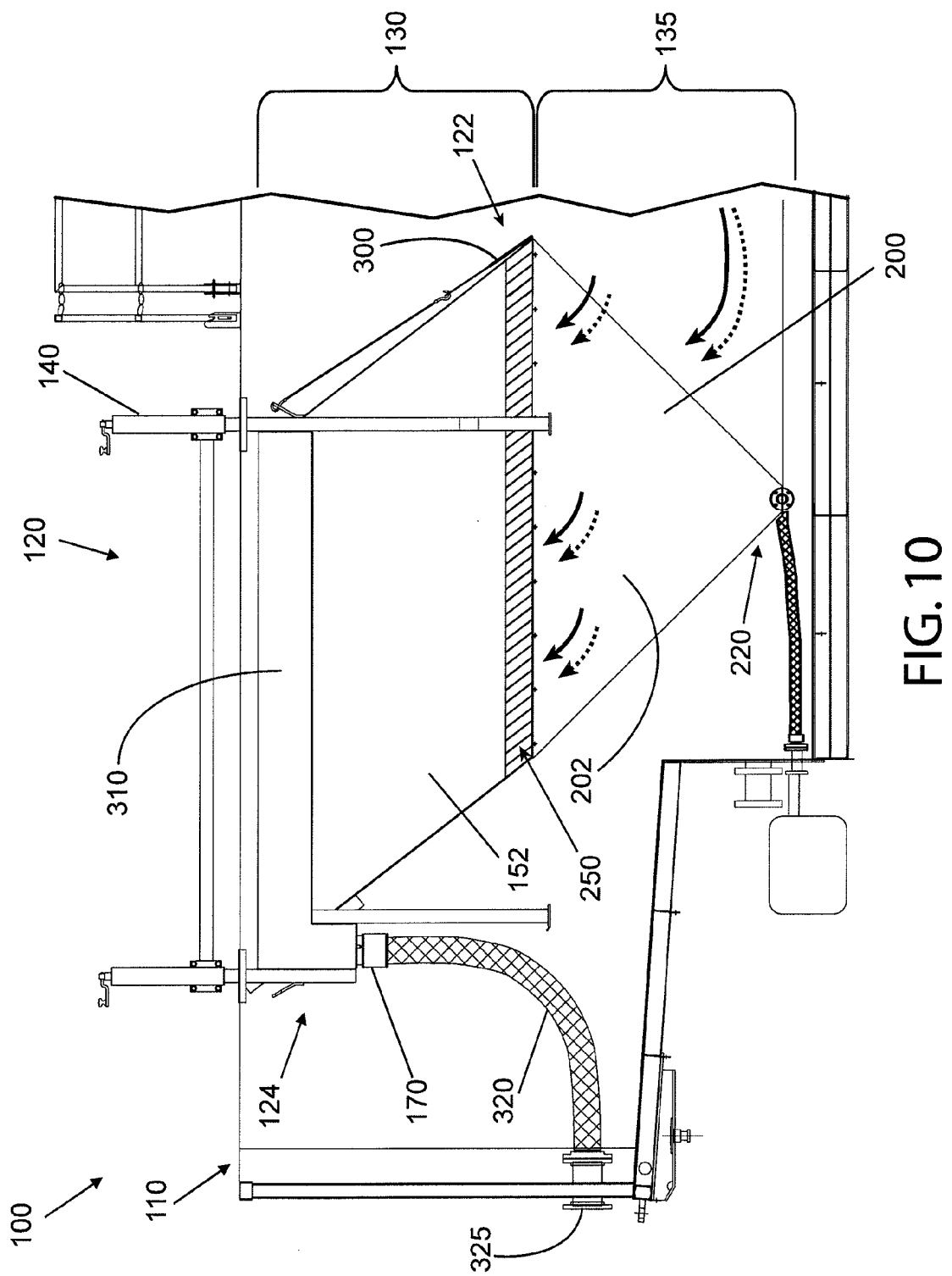
Figure 11:
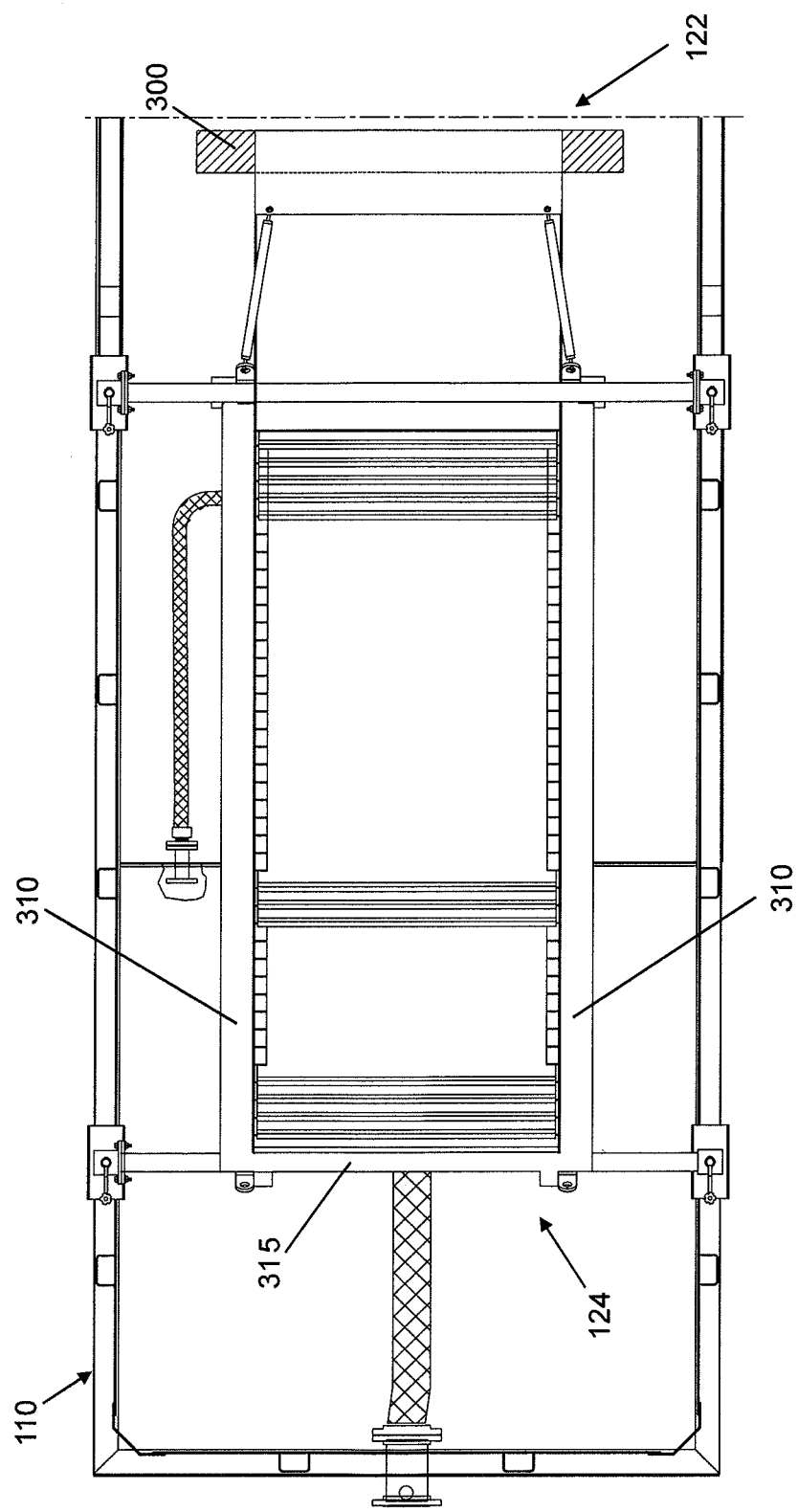

Having thus described the invention in general terms, reference will now be made to the accompanying drawings, which are not necessarily drawn to scale, and wherein:

FIG. 1 shows a simplified schematic representation of a cross-section of the interior of a tank with a clarifier;

FIG. 2 shows a simplified side view of the interior of a portion of a mobile fluid treatment system and portable fluid treatment apparatus in accordance with an exemplary embodiment of the present invention;

FIG. 3 shows a simplified view of the mobile fluid treatment system and portable fluid treatment apparatus of FIG. 2 from an influent end of the apparatus in accordance with an exemplary embodiment of the present invention;

FIG. 4 shows a perspective view of an upper portion of the apparatus and support structure in accordance with an exemplary embodiment of the present invention;

FIG. 5 illustrates a settler plate partially removed from the upper portion of FIG. 4 in accordance with an exemplary embodiment of the present invention;

FIG. 6 illustrates a lateral member of the upper portion with the settler plates removed in accordance with an exemplary embodiment of the present invention;

FIG. 7 shows a perspective view of a hopper of a lower portion of the apparatus in accordance with an exemplary embodiment of the present invention;

FIG. 7A shows a close-up view of eyelets of the hopper of FIG. 7 in accordance with an exemplary embodiment of the present invention;

FIG. 8 illustrates a support structure and attachment members of the apparatus secured to a tank in accordance with an exemplary embodiment of the present invention;

FIG. 8A illustrates a close-up view of one of the attachment members of FIG. 8 in accordance with an exemplary embodiment of the present invention;

FIG. 9 shows a side view of an attachment member prior to attachment to the support structure and tank in accordance with an exemplary embodiment of the present invention;

FIG. 9A shows the attachment member of FIG. 9 after attachment to the support structure and tank in accordance with an exemplary embodiment of the present invention;

FIG. 10 shows a simplified side view of the interior of a portion of a mobile fluid treatment system and portable fluid treatment apparatus illustrating influent flow into the upper portion in accordance with an exemplary embodiment of the present invention; and FIG. 11 shows a simplified top view of the system and apparatus of FIG. 10 with portions removed to show effluent troughs in accordance with an exemplary embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the mobile systems and portable fluid treatment apparatuses are not shown in one or more of the figures for clarity and to facilitate explanation of embodiments of the present invention.

As used herein, the terms "bottom," "top," "upper," "lower," "inner," "outer," and similar terms are used for ease of explanation and refer generally to the position of certain components of embodiments of the described invention in the installed configuration (e.g., in an operational configuration). It is understood that such terms are not used in any absolute sense, and, as such, a component described as a "lower portion" may be on the same level (e.g., at the same distance from the ground) as another component described as an "upper portion" in certain configurations of embodiments of the described invention, such as when the apparatus is being transported to the installation site or is not yet fully assembled or installed. Moreover, in the description and examples provided herein, the term "sediment" is used to refer to any solids, particulates, or contaminants in fluid stream that are capable of being removed to some degree via mechanical or physical separation, such as by using one or more settler plates. In addition, the terms "liquid" and "fluid" are used synonymously herein, and although the examples provided below may refer to water treatment systems and clarifiers, it is understood that the systems and apparatuses described may be used for the treatment and cleaning of various different types of liquids, including oils and certain types of chemicals. Furthermore, the term "influent" generally refers to liquid that has not been treated by the systems and apparatuses described herein, and the term "effluent" generally refers to liquid that has been treated by the systems and apparatuses described herein. Although the examples described below may refer to frac tanks, embodiments of the invention may be used with various types of temporary (e.g., mobile) and permanent (e.g., fixed) tank installations.

Conventional clarifiers can come in a variety of sizes and configurations. Some types of conventional clarifiers are configured to be secured to the inside of a frac tank and are generally sized for use in a particular model of frac tank (e.g., a tank having a particular length, width, and depth). With reference to FIG. 1, for example, liquid influent (e.g., fluid such as water carrying suspended solids, such as dirt or other sediment) may be introduced into the tank 10 at one end of the tank, such as via an influent feed pump 20. The clarifier 30, which may include a number of inclined settler plates 40, may be attached to an opposite end of the tank, as shown in FIG. 1. The influent may be moved (e.g., via the action of the influent feed pump 20) toward the clarifier and may flow upward through the clarifier 30, as indicated by the arrows, where the solid line arrows represent the movement of solid particles and the dashed line arrows represent the movement of liquid. As the influent flows upward through the clarifier 30 along the settler plates 40, the suspended solids may be separated from the liquid and may move downward along the plates toward a bottom surface 50 of the tank 10. Clean liquid, or effluent, may proceed upward through the clarifier 30 and may be discharged through one or more effluent outlets 60 for further processing, discharge, or use, whereas the settled solids may be removed from (e.g., pumped out of) the tank through a sediment outlet 70.

As noted above, however, frac tanks can vary in size depending on the application and the configuration of the installation site, among other things. For example, a 500 barrel (500 bbl) capacity tank may have dimensions that vary depending on the manufacturer and model of the tank. The tank may, for example, have an overall length ranging from approximately 34 ft. to 45 ft.; a width ranging from approximately 8 ft. to 8.5 ft.; and a height ranging from approximately 9.5 ft. to 12 ft. For an installation site with multiple frac tanks of different sizes, this may necessitate the use of different sizes of conventional clarifiers that are specifically configured to fit a particular tank, especially with respect to width and height (depth) of the tank. This may limit (or preclude) the user's ability to use the same clarifier for different tanks (e.g., if one tank is idle and another one is operational). Moreover, conventional clarifiers are typically configured to be fixedly attached to the walls of the tank, such that the removal of the clarifier for use in another (e.g., same dimension) tank would be difficult, if not impossible.

Furthermore, frac tanks are generally configured to have flat bottoms, as depicted in FIG. 1. As a result, sediment that is removed from the fluid as it flows across the settler plates 40 of the clarifier 30 may have a tendency to collect on the flat bottom surface 50 and may collect on other horizontal surfaces of the tank, such as the surface 55 shown in FIG. 1, depending on the configuration of the tank 10 and the position of the clarifier 30 within the tank. This may impair or limit the removal of such precipitated sediment from the tank via the sediment outlet 70 in some cases, such as when the sediment is relatively large or heavy or in cases in which the sediment begins to solidify with other sediment that has collected on the surfaces over time, making it even harder to remove.

Accordingly, embodiments of the present invention provide for a portable fluid treatment apparatus and a mobile system for treating fluids in which the fluid treatment apparatus is configured to be more easily removable from the tank of fluid in which it is placed, is transferable and adaptable for use in different sizes of tanks, and is configured to allow for more efficient and effective removal of solids that are precipitated out of the influent stream.

Referring now to FIGS. 2 and 3, a simplified partial view of a mobile fluid treatment system 100, such as a mobile water treatment system, in accordance with embodiments of the present invention is shown, with some of the components removed for purposes of explanation. The mobile fluid treatment system 100 may include a mobile tank 110 and a portable fluid treatment apparatus 120 that is configured to be removably installed within the mobile tank. The portable fluid treatment apparatus 120 may be configured for separating solids from the fluid, as described in greater detail below.

In this regard, the portable fluid treatment apparatus 120 may include an upper portion 130, a lower portion 135, and a plurality of adjustable attachment members 140 that are fixed to the upper portion. The upper portion 130 may include a frame 150 and an array of settler plates 160 that are disposed within the frame in parallel arrangement. As shown in FIG. 4, the frame 150 of the upper portion 130 may, for example, include a pair of opposing lateral members 152 and a pair of opposing transverse members 154 extending between respective side edges 153 of the lateral members, such that the frame forms a body or housing for the upper portion. In some embodiments, the lateral members 152 may be arranged substantially perpendicularly with respect to a horizontal plane in the installed configuration, whereas the transverse members 154 may be arranged at an angle, e.g., inclined, with respect to the horizontal plane, as shown. The lateral members 152 and/or the transverse members 154 may be made of different materials, depending on the application (such as the type of liquid being treated) and other design considerations. For example, in some embodiments, the frame 150 may be made of wood, carbon steel, stainless steel, fiber reinforced plastic (FRP), polyethylene, or any other suitable material.

Continuing to refer to FIGS. 2 and 4, the settler plates 160 may be disposed within the frame 150 such that they extend between the opposing lateral members 152 and at an angle with respect to the horizontal plane (e.g., not perpendicular to the horizontal plane). In this way, the settler plates 160 may, in some cases as depicted, be substantially parallel to the transverse members 154 of the frame 150, as well as to each other. The number of settler plates 160, the angle of inclination, and the spacing of the plates may be varied to optimize the separation of solids from the influent in view of the type of fluid that is being treated, the type and size of the solids carried by the fluid, the volume flow rate required, and other design considerations. For example, in some cases, as few as 20 and as many as 64 settler plates 160 may be provided in the upper portion 130, and the plates may be inclined at an angle of approximately 30° from the horizontal plane to approximately 60° from the horizontal plane. Moreover, the spacing between the settler plates 160 may range between approximately 1 in. to approximately 4 in.

In addition, the material of construction of the settler plates 160 may vary and, in certain embodiments, may include fiber reinforced plastic (FRP), polypropylene, poly vinyl chloride (PVC), stainless steel, aluminum, and other materials, depending on the application (e.g., the type of liquid in the tank) and other design considerations. In some cases, the settler plates 160 may be formed of flat sheets of material, whereas in other cases corrugated sheets or other types of sheets may be used. Thus, as an example, for a 500 barrel mobile tank designed to treat water carrying sediment ranging in particle size from about 2 microns (e.g., fine silt) to about 2000 microns (e.g., coarse sand) that is introduced into the tank at a volume flow rate of approximately 240 gallons per minute, between 20 and 64 settler plates 160 may be required, and the settler plates may be optimally arranged at an angle of 52° with respect to the horizontal plane.

In some cases, each settler plate 160 may be configured to be removable from the upper portion 130 independently of the other settler plates, such that the settler plates and the upper portion may be cleaned and maintained over an extended period of time without requiring the tank to be drained and without necessitating the removal of the upper portion or the entire apparatus 120 from the tank 110. Thus, the mobile fluid treatment system 100 may be kept in service as each settler plate 160 is individually removed, cleaned, and returned to its position with the frame 150 of the upper portion 130, as illustrated in FIG. 5.

For example, turning to FIG. 6, each lateral member 152 may comprise a plurality of guides 156, with each guide being configured to receive one of the settler plates 160 (not shown in FIG. 6). In this regard, the guides 156 may be fixed (e.g., welded, adhered, or otherwise attached to the respective lateral member 152) at the angle of inclination at which it is desired that the settler plates 160 be disposed. Furthermore, a support rail 158 may be attached to the bottom ends 157 of the guides 156 of each respective lateral member 152, such that each settler plate that is received within the frame is supported along opposite edges by a pair of guides and along its bottom corners by the support rail. Because the settler plates 160 are effectively held in place within the framework of the lateral members 152, the guides 156, and the support rails 158 by gravity and are not otherwise adhered or fixedly attached to this framework, each settler plate may be individually removed from the upper portion 130 without disrupting the operation of the apparatus 120, as noted above.

Turning again to FIG. 2, the upper portion 130 may thus be configured to direct fluid upward toward an effluent outlet 170 and, in so doing, to precipitate sediment from the fluid. Thus, fluid exiting the tank via the effluent outlet 170 may be considered treated, or "clean," liquid.

The lower portion 135, in turn, may be configured to collect the sediment that is precipitated from the fluid and may comprise a sediment outlet 180 that is configured for removing the sediment from the tank 110. In some embodiments, for example, the lower portion may comprise a hopper 200, shown alone in FIG. 7, that is configured to collect and funnel the sediment toward the sediment outlet 180. The hopper 200 may, for example, include four inclined walls 202, 204 that are joined at adjacent edges 210, such that they form an inverted pyramidal shape, as depicted. Opposite pairs of lateral walls 202 may be inclined towards each other at the same angle from a horizontal plane, which may differ from the angle of inclination of the adjacent pair of transverse walls 204. For example, the pair of lateral walls 202 of the hopper 200 corresponding to the lateral members 152 of the upper portion 130 may be inclined at an angle of approximately 45°-80°, such as approximately 75°, from the horizontal plane, whereas the pair of transverse walls 204 corresponding to the transverse members 154 of the upper portion may be inclined at an angle of approximately 30°-60°, such as approximately 47° from the horizontal plane.

The sediment outlet 180 may be disposed proximate the inverted "apex" of the hopper 200. In this way, sediment moving downward from the upper portion 130 into the lower portion 135 may be directed into and more efficiently withdrawn via the sediment outlet 180. Thus, in general, providing a steeper angle of inclination with respect to the horizontal plane may allow for more efficient removal of the sediment from the lower portion by encouraging sediment to move downward toward the sediment outlet 180 due to the force of gravity.

In some embodiments, the hopper 200 may be a flexible hopper. Said differently, the hopper 200 may include walls 202, 204 that are made of sheets of flexible material, such as polyethylene, polypropylene, vinyl, or any other material with properties that allow the material to yield or bend to some degree when a force is applied. The flexibility of the hopper 200 in such embodiments may provide the apparatus 120 depicted in FIG. 2 with a certain amount of tolerance, such that the apparatus may be installed in tanks 110 of different depths. For example, due to the flexibility of the hopper 200, the apparatus 120 may be used in tanks having depths that vary from each other by as much as 30 in. A portable fluid treatment apparatus 120 having an overall height of approximately 11 ft. from the top of the upper portion 130 to the bottom of the lower portion 135 may, for example, be used in tanks 110 having a depth ranging from 9.5 ft. to 12 ft.

This is because in tanks that are shallower than the overall length of the apparatus 120, within a predetermined range of depths, the flexibility of the hopper 200 allows the hopper, when resting on the bottom surface of the tank, to assume a "shorter" height as the density of the fluid in the lower portion 135 creates a downward force on the lower portion 135 and compresses the flexible material of the hopper 200 (in particular, the bottom part 220) against the bottom surface of the tank 110. In tanks that are deeper than the overall length of the apparatus 120, within the predetermined range of depths, the bottom part 220 of the hopper 200 may not rest or contact the bottom surface of the tank 110 at all, but rather may be suspended a short distance from the bottom surface, as shown in FIGS. 2 and 3.

In addition to providing the hopper 200 with a certain tolerance to allow the apparatus 120 to be used in tanks 110 having a certain range of depths, the flexibility of the hopper may also allow for more efficient and complete withdrawal of sediment from the hopper. For example, in some embodiments, the sediment outlet 180 of the hopper 200 may be in fluid communication with a sediment withdrawal pump 230 (shown in FIG. 2) that is configured to remove the precipitated sediment from the flexible hopper. The sediment withdrawal pump 230 may, for example, be located outside the tank 110, as depicted. In such embodiments, the flexible hopper 200 may be configured to vibrate in response to the operation of the sediment withdrawal pump 230. In other words, the reciprocal action of the pump 230 may cause vibrations that are transferred to the walls 202, 204 of the hopper 200 (e.g., via the mechanical connections between the pump and the sediment outlet 180), which may in turn cause the walls of the hopper to vibrate. The vibration of the flexible hopper 200 may serve to break up any sediment that is collected in the bottom portion 220 of the flexible hopper, thereby keeping the sediment loose and discouraging the solidification of the sediment in the event the sediment builds up so as to facilitate withdrawal of the sediment from the hopper (e.g., via the sediment outlet 180).

As depicted in FIGS. 4 and 7, the upper and lower portions 130, 135 of the apparatus 120 may be manufactured as separate pieces and subsequently assembled (e.g., in conjunction with other components, such as the adjustable attachment members discussed below) to form the apparatus. The upper and lower portions 130, 135 may be assembled prior to transportation to the site of installation in some cases, but in other cases may be transported to the installation site separately and assembled on-site. Moreover, the upper and lower portions 130, 135 may be assembled prior to placement in the mobile tank 110 in some instances, whereas in other instances each portion may be placed in the tank separately and may then be assembled while inside the tank, which may be drained of fluid during the assembly process.

In this regard, the lateral walls 202 of the hopper 200 corresponding to the lateral members 152 of the upper portion 130 may define eyelets 240, shown in FIG. 7 and shown in a close-up view in FIG. 7A. The eyelets 240 may, for example, be circular or oblong openings punched or otherwise defined near a top edge 245 of the lateral walls 202 of the hopper 200. The eyelets 240 may be distributed along the top edge 245 of each lateral wall 202 of the hopper 200 such that when the lower portion 135 and the upper portion 130 are brought together for assembly, each eyelet is disposed proximate a corresponding influent slot 250 of the upper portion, shown in FIG. 6 and discussed in greater detail below. Each influent slot 250, as shown, may be defined on two sides by adjacent guides 156 of the respective lateral member 152 of the upper portion 130, on a top side by a portion of the bottom edge of the lateral member 152, and on a bottom side by a portion of the support rail 158. The size and spacing of the eyelets 240 may vary depending on the size, material of construction, and weight of the lower portion 135, among other factors. For example, in some embodiments, the eyelets 240 may be sized to have a diameter of between approximately 0.75 in. and 2 in., such as approximately 1 in., and may be spaced between approximately 6 in. and 18 in. apart, such as approximately 12 in. apart. Moreover, each eyelet 240 may be reinforced, such as via a grommet (e.g., a brass grommet). Fasteners (not shown), such as rings, zip ties, hooks, or other loop-type fasteners, may thus be used to connect an eyelet 240 to a corresponding influent slot 250 for attaching the upper portion 130 of the apparatus 120 to the lower portion 135. In this way, the attachment of the upper and lower portions 130, 135, although secure, may be reversible (e.g., by unhooking the hooks or cutting the zip ties) such that the upper and lower portions may be disassembled for cleaning, maintenance, installation in another tank 110, or any other purpose, as needed.

Referring again to FIGS. 2 and 3, and as noted above, a plurality of adjustable attachment members 140 may be provided that are fixed to the upper portion 130 and are configured to removably secure the apparatus 120 to the side walls of the tank 110, such that the apparatus can be moved from one tank to another. In the depicted embodiment, the apparatus 120 includes four attachment members 140. As shown in FIG. 4, for example, the attachment members 140 may be fixed to the upper portion 130 via a support structure 260, which may include support arms 262 that extend outward from the walls (e.g., the lateral members 152 in the depicted embodiment) of the upper portion. The support structure 260, in some cases, may further include support legs 264 that are configured to support the upper portion 130 in an upright position prior to assembly of the upper portion with the lower portion 135, such as during manufacture, inspection, or transportation of the upper portion to the installation site. Once the upper portion 130 is installed with the lower portion 135 in a tank 110 and the apparatus 120 is operational, however, the support legs 264, although still present, may no longer be needed to support the weight of the upper portion (as shown in FIG. 2).

Turning now to FIGS. 8, 8A, 9, and 9A, which show the attachment members 140 in greater detail, the support structure 260 and, in particular, the support arms 262, may be arranged such that the attachment members are disposed at the corners of the apparatus 120. Moreover, in the depicted embodiment, the support arms 262 of the support structure 260 are positioned such that each pair of attachment members 140 may engage a top edge 113 of a respective lateral wall 112 of the tank 110. Support arms 262 having different lengths may be used, depending on the width of the tank 110. In this way, tanks 110 having different widths may be accommodated.

With reference to FIG. 9, which depicts an unassembled configuration, for example, each attachment member 140 may comprise a first engaging part 270 and a second engaging part 275. The first engaging part 270 may be configured to be fixed to the upper portion 130 of the apparatus 120 (e.g., via the support structure 260, as described above), and the second engaging part 275 may be configured to engage a corresponding edge 113 of a side wall of the tank 110 (e.g., a lateral wall 112, as described above). Thus, in some embodiments, the first engaging part 270 may be substantially perpendicular to the second engaging part 275, as depicted.

The first engaging part 270 may, for example, comprise a flange 272, and the flange may be configured to be secured to a corresponding flange 282 of the upper portion 130, such as a flange of the corresponding support arm 262, via fasteners (e.g., bolts, screws, etc.), as shown in FIG. 9A in an assembled configuration. The flange 272 of the first engaging part 270 may be secured to the corresponding flange 282 of the support arm 262 to fix the attachment member 140 to the upper portion 130 prior to placement of the upper portion and/or lower portion 135 in the tank (e.g., prior to engagement of the second engaging part 275 with the side wall of the tank 110).

In some embodiments, the second engaging part 275 may define an open channel 276, and the open channel may be configured to receive the edge 113 of the corresponding side wall 112 of the tank 110, as shown in FIG. 9A. To allow for the attachment members 140 to fit and be secured to tanks of different sizes and configurations, the open channel 276 may, in some cases, have a width that is larger than a width of the corresponding edge 113 of the side wall 112 of the tank 110. Accordingly, the second engaging part 275 may engage the side wall 112 of the tank 110 and secure the apparatus 120 to the tank via gravity and friction between the second engaging part and the edge 113 alone in some cases, rather than through any mechanical or chemical fastening methods.

In some embodiments, the attachment members 140 may be configured to be independently adjustable. In particular, a distance d (shown in FIG. 9) between the first engaging part 270 and the second engaging part 275 of each attachment member 140 may be adjustable by a user, such as via an adjustment crank 290 of the attachment member 140. The adjustment crank 290 may be connected to an inner portion 292 of the attachment member 140, which is disposed and configured to move within an outer portion 294 of the attachment member. In this way, the distance d between the first and second engaging parts 270, 275 of each attachment member 140 may be adjusted (e.g., lengthened or shortened) as necessary when the apparatus 120 is installed in a tank 110 to achieve a level installation of the apparatus. A level installation (e.g., an installation of the apparatus 120 that is level with a horizontal plane of the liquid in the tank) may be important for optimizing the distribution of liquid among the settler plates of the upper portion and maximizing the area of settler plates across which the liquid may flow once the apparatus is in operation to provide for a more efficient removal of solids from the liquid being treated. In installations that are made on uneven ground, for example, the tank 110 itself may not be level. As such, one or more of the attachment members 140 may need to be adjusted to different extents to achieve a level installation. Moreover, although the depicted adjustment mechanism comprises an adjustment crank 290 that uses a screw jack-type of adjustment mechanism to change the distance d, other types of adjustment mechanisms may be used, such as a pneumatic jack mechanism.

Referring now to FIG. 10, the flow of liquid through the tank 110, into the apparatus 120 as influent, and out of the apparatus as clean effluent will be described. In FIG. 10, the flow of liquid is represented by dashed line arrows, whereas the flow of sediment carried by or precipitated from the liquid is shown in solid line arrows.

Accordingly, liquid carrying sediment (influent) may be introduced into the tank 110 at an influent end of the tank (not shown) and may be caused to flow toward the apparatus 120, as depicted. The influent may enter the apparatus 120 for treatment via the influent slots 250 described above with reference to FIG. 6 that are defined between the lateral members 152 of the upper portion 130 of the apparatus and the lateral walls of the lower portion 135 (e.g., the lateral walls 202 of the hopper 200).

To encourage a more evenly distributed flow of the influent into the upper portion 130 through the influent slots 250 (e.g., such that the flow through influent slots closer to an influent end 122 of the apparatus 120 is substantially similar to the flow through influent slots closer to an effluent end 124 of the apparatus), a flow deflector 300 may be arranged at the influent end that extends at least partially between two opposing side walls of the tank 110 (e.g., the two lateral walls 112, shown in FIG. 3). The flow deflector 300 may thus be configured to direct the fluid in the tank to flow around the influent end 122 of the apparatus 120 and toward the influent slots 250 defined between the upper portion 130 and the lower portion 135, as described above, to introduce the fluid into the upper portion.

In some cases, the flow deflector 300 may comprise a rectangular sheet of material (such as wood, carbon steel, stainless steel, fiber reinforced plastic (FRP), polyethylene, or any other suitable material) that is attached to the hopper 200 of the lower portion via a transverse wall 204 of the hopper, as shown in FIG. 7, and extends outward past the lateral walls 202. For example, the flow deflector 300 may have a height of between approximately 8 in. and 18 in., such as approximately 12 in., and may extend a distance of between approximately 8 in. and 18 in., such as by approximately 12.5 in., on each side of the lateral walls 202 of the hopper 200. The deflector 300 may, for example, be sewn or otherwise incorporated into a sleeve on the flap 301 that rests on the front surface of the apparatus 120 and may be held in place by straps 302 attached to the two lifting eyes 303 on the front of the apparatus.

As influent flows into the upper portion 130 through the influent slots 250, the influent will flow inward (from both sides of the apparatus 120) and upward across the settler plates, such that at least some of the solids suspended in the influent are caused to fall downward into the lower portion 135 and are funneled by the hopper 200 toward the sediment outlet 180, as described above. Accordingly, liquid that has at least some of the solids removed via flow across the settler plates (effluent) may continue to flow upward through the upper portion 130. With reference to FIG. 6, each lateral member 152 of the upper portion 130 may define a plurality of effluent orifices 305, and each effluent orifice 305 may be configured to allow the treated fluid, or effluent, that has reached the top of the upper portion 130 to flow from the apparatus 120 toward the effluent outlet 170, shown in FIG. 10.

In this regard, two parallel effluent troughs 310 may be provided on either side of the upper portion 130, as shown in FIG. 10, which depicts a top view of the system with portions removed (e.g., portions of the support structure) to allow the effluent troughs 310 to be visible. Referring to FIGS. 6 and 10, effluent may thus flow from the upper portion 130, through the effluent orifices 305, and into a respective effluent trough 310. A trough connector 315 may connect the two effluent troughs 310 and may serve to direct the effluent into the effluent outlet 170. Other connections, such as hoses and tubing 320 may be provided to withdraw the effluent from the system, e.g., via a discharge port 325, for use or further processing, as needed.

The number, size, and spacing of the effluent orifices 305 shown in FIG. 6 may vary depending on the type of liquid being treated, the size of the system, the required volume flow rate, and other design considerations. For example, the orifices 305 may be circular, square, or oval, and circular orifices may have a diameter of approximately 0.5 in. to approximately 1 in. The orifices 305 may be spaced approximately 1 in. to approximately 2 in. apart. In some embodiments, only one orifice 305 may be provided between two adjacent settler plates. In other embodiments, such as an embodiment in which the settler plates are spaced approximately 4 in. apart, two orifices 305 may be provided between adjacent settler plates. Furthermore, in some embodiments, the effluent orifices 305 may be configured to create back pressure within the upper portion 130 of the apparatus 120. The back pressure that is created may further facilitate the distribution of fluid among the settler plates, further maximizing the efficiency of the system.

As noted above, the structures and components depicted in the figures have been simplified for clarity and ease of explanation. As such, one or more of the connectors, pumps, hosing, fasteners, support structure, filter elements, etc., although described above, may not be shown in the figures. In addition, many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A portable fluid treatment apparatus configured to be placed within a mobile tank of fluid for separating solids from the fluid, the apparatus comprising:

an upper portion comprising a frame and an array of settler plates disposed within the frame in a parallel arrangement that are configured to direct fluid upward toward an effluent outlet and to precipitate sediment from the fluid;

a lower portion configured to collect the sediment that is precipitated from the fluid, wherein the lower portion comprises a sediment outlet configured to remove the sediment; and a plurality of attachment members fixed to the upper portion, wherein each attachment member comprises an engaging surface configured to engage a top edge of a corresponding side wall of the tank so as to removably secure the apparatus to the tank via gravity and friction, wherein the apparatus can be moved from one tank to another, and wherein the attachment members are independently adjustable and comprise a plurality of engaging parts that are adjustable relative to each other, such that each of an operating height, a longitudinal slant, and a latitudinal slant is adjustable to correspond to an orientation of the mobile tank in which the apparatus is placed via manipulation of one or more of the independently adjustable attachment members.

2. The portable fluid treatment apparatus of claim 1, wherein each settler plate is removable from the upper portion independently of other settler plates.

3. The portable fluid treatment apparatus of claim 1, wherein each attachment member comprises a first engaging part and a second engaging part, wherein the first engaging part is configured to be fixed to the upper portion of the apparatus, wherein the second engaging part comprises the engaging surface that is configured to engage the top edge of the corresponding side wall of the tank, and wherein the first engaging part is substantially perpendicular to the second engaging part.

4. The portable fluid treatment apparatus of claim 3, wherein the first engaging part comprises a flange, wherein the flange is configured to be secured to a corresponding flange of the upper portion via fasteners.

5. The portable fluid treatment apparatus of claim 3, wherein the second engaging part defines an open channel comprising the engaging surface and two lateral extensions extending substantially perpendicularly from opposite ends of the engaging surface, wherein the open channel is configured to receive the edge of the corresponding side wall of the tank.

6. The portable fluid treatment apparatus of claim 5, wherein a width of the open channel is larger than a width of the corresponding edge of the side wall of the tank.

7. The portable fluid treatment apparatus of claim 3, wherein a distance between the first engaging part and the second engaging part is adjustable.

8. The portable fluid treatment apparatus of claim 1, wherein the lower portion comprises a flexible hopper configured to collect and funnel the sediment toward the sediment outlet.

9. The portable fluid treatment apparatus of claim 8 further comprising a sediment withdrawal pump configured to remove the precipitated sediment from the lower portion, wherein the flexible hopper is configured to vibrate in response to operation of the sediment withdrawal pump, and wherein vibration of the flexible hopper serves to break up sediment collected in the flexible hopper and facilitate withdrawal of the sediment from the hopper.

10. The portable fluid treatment apparatus of claim 1 further comprising a flow deflector arranged at an influent end of the apparatus and extending at least partially between two opposing side walls of the tank, wherein the flow deflector is configured to direct the fluid in the tank around the influent end of the apparatus and toward influent slots defined between the upper portion and the lower portion to introduce the fluid into the upper portion.

11. The portable fluid treatment apparatus of claim 1, wherein the frame of the upper portion comprises a pair of opposing lateral members and a pair of opposing transverse members extending between respective side edges of the lateral members, wherein each lateral member comprises a plurality of guides, each guide configured to receive one of the plurality of settler plates, and wherein each lateral member defines a plurality of effluent orifices, each effluent orifice configured to allow treated fluid to flow from the portable fluid treatment apparatus toward the effluent outlet.

12. A portable fluid treatment apparatus configured to be placed within a mobile tank of fluid for separating solids from the fluid, the apparatus comprising:

an upper portion comprising a frame and an array of settler plates disposed within the frame in a parallel arrangement that are configured to direct fluid upward toward a fluid outlet and to precipitate sediment from the fluid;

a lower portion comprising a flexible hopper configured to collect and funnel the sediment that is precipitated from the fluid toward a sediment outlet, wherein the flexible hopper comprises four walls that are joined at adjacent edges and is submerged within the mobile tank of fluid when the apparatus is in operation; and a plurality of attachment members fixed to the upper portion, wherein each attachment member comprises an open channel comprising an engaging surface and two lateral extensions extending substantially perpendicularly from opposite ends of the engaging surface, and wherein the open channel is configured to receive the edge of a corresponding side wall of the tank, and wherein the apparatus is configured to be removably secured to side walls of the tank via the plurality of attachment members, such that the apparatus can be moved from one tank to another.

13. The portable fluid treatment apparatus of claim 12, wherein the sediment outlet is in fluid communication with a sediment withdrawal pump that is configured to remove the precipitated sediment from the flexible hopper.

14. The portable fluid treatment apparatus of claim 13, wherein the flexible hopper is configured to vibrate in response to operation of the sediment withdrawal pump, and wherein vibration of the flexible hopper serves to break up sediment collected in the flexible hopper and facilitate withdrawal of the sediment from the hopper.

15. The portable fluid treatment apparatus of claim 12, wherein the flexible hopper comprises a material selected from the group consisting of polyethylene, polypropylene, and vinyl.

16. The portable fluid treatment apparatus of claim 12, wherein the flexible hopper is configured to allow the apparatus to be installed in tanks having different depths within a predetermined range of depths.

17. A mobile fluid treatment system comprising:
a mobile tank; and
a portable fluid treatment apparatus configured to be removably combined with the mobile tank, wherein the portable fluid treatment comprises:
an upper portion comprising a frame and an array of settler plates disposed within the frame in a parallel arrangement that are configured to direct fluid upward toward a fluid outlet and to precipitate sediment from the fluid;
a lower portion comprising a hopper configured to collect and funnel the sediment that is precipitated from the fluid toward a sediment outlet, wherein the flexible hopper comprises four walls that are joined at adjacent edges and is submerged within the mobile tank of fluid when the apparatus is in operation; and
a plurality of independently adjustable attachment members fixed to the upper portion,
wherein each attachment member comprises an open channel comprising an engaging surface and two lateral extensions extending substantially perpendicularly from opposite ends of the engaging surface, and wherein the open channel is configured to receive the edge of a corresponding side wall of the tank, and
wherein the attachment members are configured to removably secure the portable fluid treatment apparatus to the tank such that the portable fluid treatment apparatus can be moved from one tank to another.

18. The mobile fluid treatment system of claim 17, wherein the sediment outlet of the lower portion of the portable fluid treatment apparatus is in fluid communication with a sediment withdrawal pump that is configured to remove the precipitated sediment from the lower portion, wherein the hopper is flexible and is configured to vibrate in response to operation of the sediment withdrawal pump, and wherein vibration of the hopper serves to break up sediment collected in the hopper and facilitate withdrawal of the sediment from the hopper.

19. The mobile fluid treatment system of claim 17, wherein each attachment member comprises a first engaging part and a second engaging part, wherein the first engaging part is configured to be fixed to the upper portion of the apparatus, wherein the second engaging part comprises the open channel and is configured to engage the corresponding side wall of the tank, and wherein a distance between the first engaging part and the second engaging part is adjustable.

* * * * *